US009253374B2

(12) United States Patent
Kobayashi

(10) Patent No.: US 9,253,374 B2
(45) Date of Patent: Feb. 2, 2016

(54) IMAGE PROCESSING APPARATUS AND METHOD FOR CONTROLLING THE SAME FOR OBTAINING AND APPLYING GAMMA CHARACTERISTICS TO REDUCE A DIFFERENCE BETWEEN LIGHT AND DARK AREAS OF AN IMAGE

(71) Applicant: CANON KABUSHIKI KAISHA, Tokyo (JP)

(72) Inventor: Takashi Kobayashi, Suzaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 14/107,338

(22) Filed: Dec. 16, 2013

(65) Prior Publication Data

US 2014/0168465 A1    Jun. 19, 2014

(30) Foreign Application Priority Data

Dec. 18, 2012    (JP) ................................. 2012-276123

(51) Int. Cl.
*H04N 5/202* (2006.01)
*H04N 9/69* (2006.01)

(52) U.S. Cl.
CPC ................. *H04N 5/202* (2013.01); *H04N 9/69* (2013.01); *G09G 2320/0276* (2013.01); *G09G 2320/0673* (2013.01)

(58) Field of Classification Search
USPC ........................................................ 348/254
See application file for complete search history.

(56) References Cited

U.S. PATENT DOCUMENTS

| 8,411,987 | B2 * | 4/2013 | Han | G06T 5/20 345/20 |
|---|---|---|---|---|
| 2003/0095192 | A1 * | 5/2003 | Horiuchi | 348/222.1 |
| 2007/0268524 | A1 * | 11/2007 | Nose | G09G 3/2007 358/3.01 |
| 2009/0060379 | A1 * | 3/2009 | Manabe | 382/274 |
| 2010/0034458 | A1 * | 2/2010 | Tada | 382/167 |
| 2010/0177215 | A1 * | 7/2010 | Kita | G06T 5/008 348/234 |
| 2010/0194777 | A1 * | 8/2010 | Yamano et al. | 345/595 |
| 2010/0265356 | A1 * | 10/2010 | Takano et al. | 348/223.1 |

FOREIGN PATENT DOCUMENTS

JP    2007-201655 A    8/2007

* cited by examiner

*Primary Examiner* — Shahbaz Nazrul
(74) *Attorney, Agent, or Firm* — Carter, DeLuca, Farrell & Schmidt, LLP

(57) ABSTRACT

An image processing apparatus capable of obtaining a gamma characteristic (non-linear conversion characteristic) giving consideration to a difference between light and dark parts in a subject region is provided along with a method for controlling the same. A value indicating the difference between light and dark parts in the subject region is calculated based on image data. Then, by interpolating multiple basic gamma characteristics using the value indicating the difference between light and dark parts, a gamma characteristic depending on the difference between light and dark parts is generated and applied to the image data.

9 Claims, 7 Drawing Sheets

BLOWN-OUT HIGHLIGHT REGION

FACE REGION

FIG. 7A
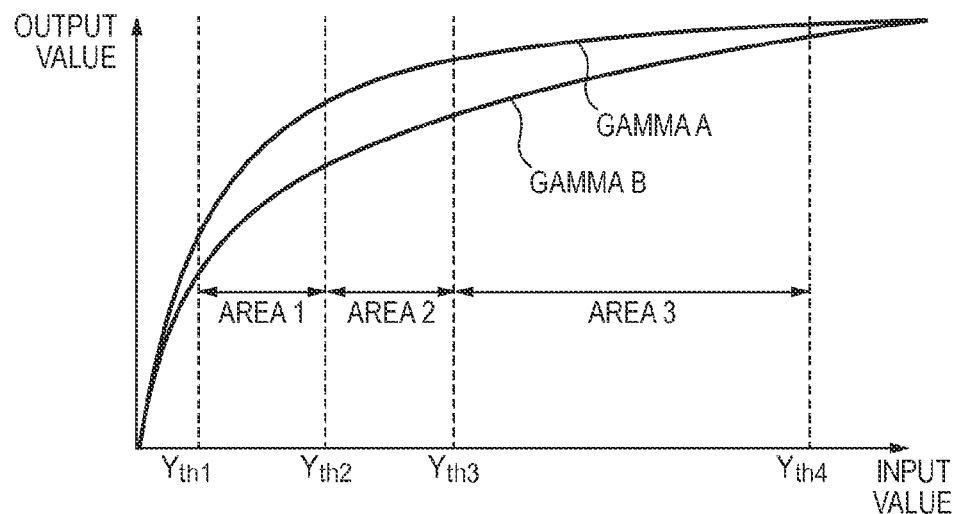
FIG. 7B
|  | SLOPE | | |
| --- | --- | --- | --- |
|  | AREA 1 | AREA 2 | AREA 3 |
| GAMMA A | LARGE | ALMOST THE SAME | SMALL |
| GAMMA B | SMALL | ALMOST THE SAME | LARGE |
FIG. 7C
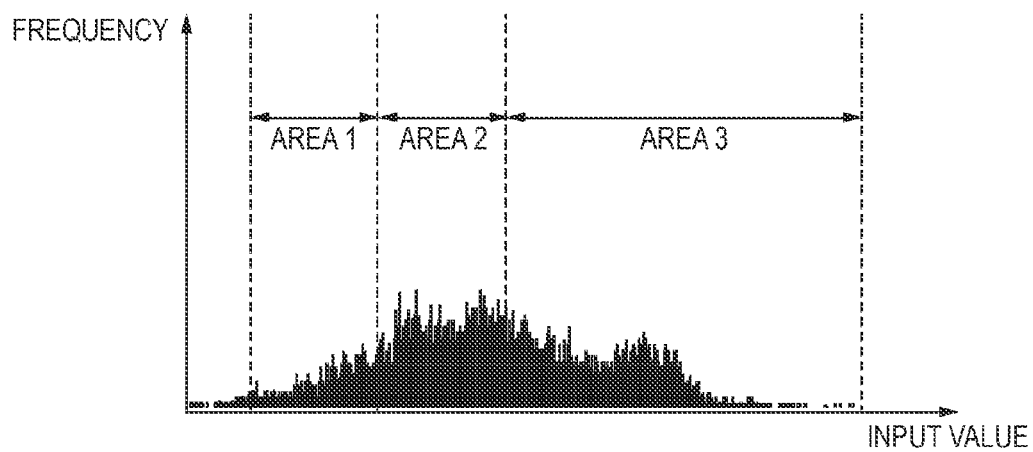

IMAGE PROCESSING APPARATUS AND METHOD FOR CONTROLLING THE SAME FOR OBTAINING AND APPLYING GAMMA CHARACTERISTICS TO REDUCE A DIFFERENCE BETWEEN LIGHT AND DARK AREAS OF AN IMAGE

BACKGROUND OF THE INVENTION

1. Field of the Invention

The present invention relates to an image processing apparatus and a method for controlling the same, and in particular relates to an image forming apparatus that applies a non-linear conversion to an image to improve image quality, and a method for controlling the same.

2. Description of the Related Art

It is known that gamma correction is performed in order to adjust tone in a captured image in a conventional digital still camera, digital video camera, or the like. Gamma correction is non-linear conversion that is performed with respect to the luminance of a captured image, and a non-linear conversion characteristic is also referred to as a gamma characteristic, a gamma curve, or the like.

By correcting a gamma characteristic in accordance with the features of an image, it is possible to restrain blown-out highlights and blocked-up shadows in an image. Japanese Patent Laid-Open No. 2007-201655 discloses that the occurrence of blown-out highlights that appear when a reference gamma characteristic is applied is predicted based on the ratio of frequencies in four equal regions of an image density (luminance) histogram, and the reference gamma characteristic is corrected such that blown-out highlights are restrained.

Japanese Patent Laid Open No. 2007-201655 also discloses that if, based on the average density of a face region, it is predicted that an unpleasant influence will appear in the image quality of the face region when the corrected reference gamma characteristic is applied, the gamma characteristic is further corrected in order to avoid the unpleasant influence.

Since a face is not a flat region, with general shooting conditions in which light comes from an oblique direction with respect to the face, there is a difference between light and dark parts in the face region and the difference between light and dark parts varies according to the positional relationship between the face and the light source, the intensity of the light source, and the like. However, in Japanese Patent Laid-Open No. 2007-201655, no correction or setting of a gamma characteristic that gives consideration to the difference between light and dark regions in a face region is considered, and the post-correction gamma characteristic may not necessarily be appropriate for the image quality of the face region.

SUMMARY OF THE INVENTION

In view of the conventional technology, the present invention provides an image processing apparatus capable of obtaining a gamma characteristic (non-linear conversion characteristic) with consideration given to the difference between light and dark parts of a subject region, and a method for controlling the same.

According to one aspect of the present invention, there is provided an image processing apparatus comprising: a detection unit that detects a subject region based on image data; an obtaining unit that obtains a value indicating a difference between light and dark parts of the subject region; a generation unit that generates a non-linear conversion characteristic by interpolating a plurality of non-linear conversion characteristics using the value indicating the difference between light and dark parts; and a correction unit that applies the non-linear conversion characteristic that was generated by the generation unit to the image data.

According to another aspect of the present invention, there is provided a method for controlling an image processing apparatus, the method comprising: a detection step of detecting a subject region based on image data; an obtainment step of obtaining a value indicating a different between light and dark parts in the subject region; a generation step of generating a non-linear conversion characteristic by interpolating a plurality of non-linear conversion characteristics using a value indicating the difference between light and dark parts; and a correction step of applying the non-linear conversion characteristic generated in the generation step to the image data.

Further features of the present invention will become apparent from the following description of exemplary embodiments with reference to the attached drawings.

BRIEF DESCRIPTION OF THE DRAWINGS

FIG. 7A is a diagram showing an example of area divisions in a range of input values according to an embodiment of the present invention.

FIG. 7B is a diagram showing a magnitude relationship between the slopes of gamma characteristic A and gamma characteristic B in respective areas according to an embodiment of the present invention.

FIG. 7C is a diagram showing an example of a pixel frequency distribution and area divisions according to an embodiment of the present invention.

DESCRIPTION OF THE EMBODIMENTS

Exemplary embodiments of the present invention will now be described in detail in accordance with the accompanying drawings.

Note that although a digital camera will be described below as an example of an apparatus to which the image processing apparatus according to the present invention has been applied, the present invention is applicable to any apparatus that handles images. Specific non-limiting examples of this include mobile phones, personal computers, game devices, media players, navigation systems, automobiles, household appliances, and the like.

Figure 1:
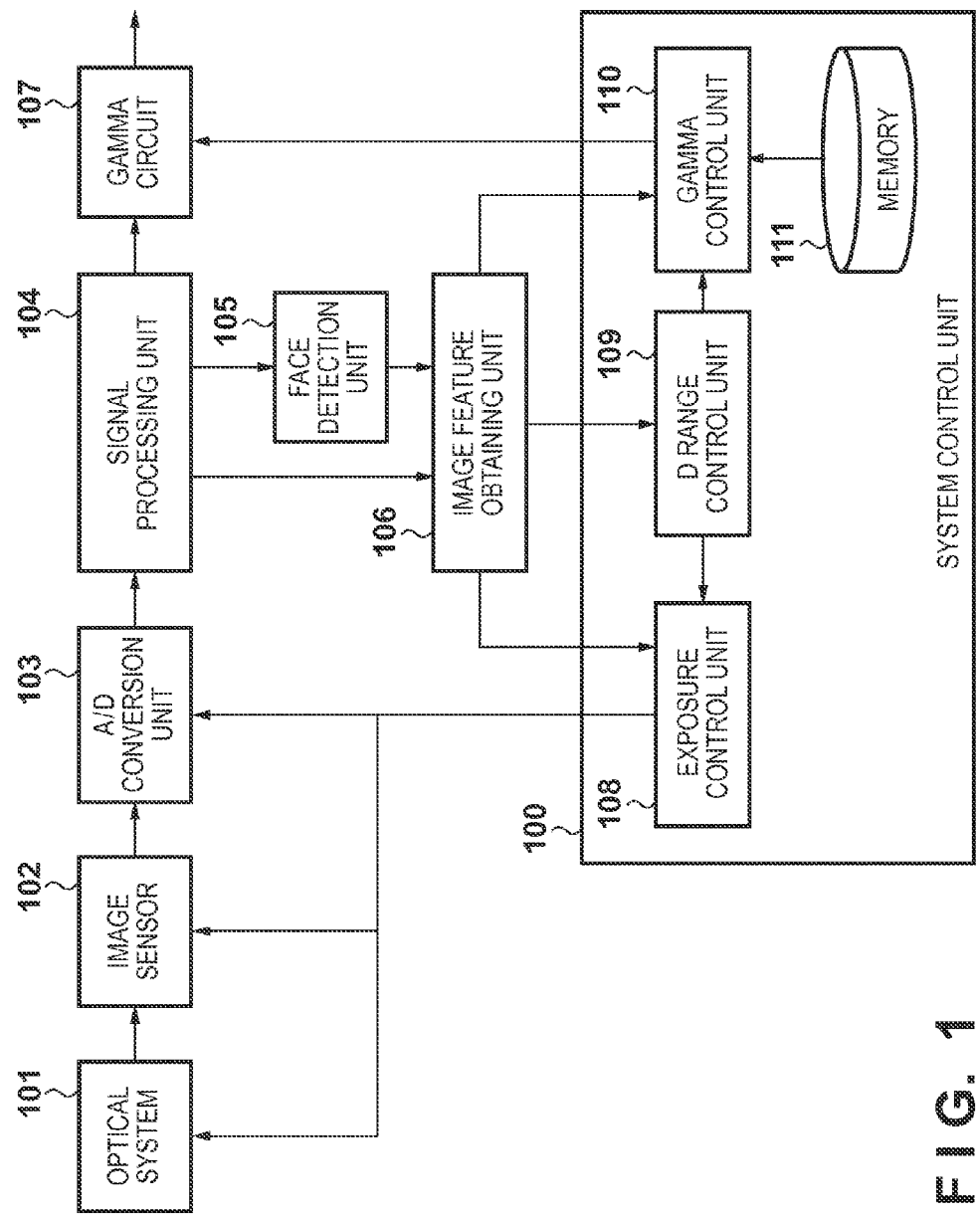
FIG. 1 is a block diagram showing an example of a configuration of a digital video camera serving as an example of an imaging apparatus according to an embodiment of the present invention.

FIG. 1 is a block diagram showing a functional configuration of a digital video camera as an example of an image processing apparatus according to an embodiment of the present invention. The arrows in the drawing indicate the flow of signals between functional blocks. An optical system 101 has an aperture function (including an ND filter), an auto-focus function, a zoom function, and the like, and forms an optical image of a subject on an imaging surface of an image sensor 102. The image sensor 102 is a photoelectric conversion element such as a CCD image sensor or a CMOS image sensor. The image sensor 102 converts a subject image that was formed on the imaging surface into electrical signals in units of pixels and outputs analog image signals.

An A/D conversion unit 103 converts the analog image signals into digital image signals having digital values in accordance with a determined gain control value. The signal control unit 104 applies a white balance adjustment, color interpolation (de-mosaicking) processing, and the like to the digital image signals. A face detection unit 105 applies a publicly-known face detection method to the image data generated by the image processing unit 104 and detects a region that is included in the captured image and has the features of a person's face (face region).

An image feature obtaining unit 106 extracts features of an arbitrary region in the image from the image data output from the signal processing unit 104. A gamma circuit 107 applies a gamma curve (gamma characteristic) having a predetermined input-output characteristic to the image data output from the signal processing unit 104 and thereby converts the luminance level of the image data. A system control unit 100 controls the above-described functional blocks and causes them to realize later-described operations. In addition, the system control unit 100 controls other functional blocks as needed and realizes the operation of the entire digital camera.

The system control unit 100 further includes multiple control blocks. An exposure control unit 108 controls the optical system 101, the image sensor 102, and the A/D conversion unit 103. A dynamic range control unit (D range control unit) 109 determines a target D range according to image characteristics such as the degree of blown-out highlights in the entire image, and the degree of blown-out highlights in the face region detected by the face detection unit 105 and the like. The D range control unit 109 changes the exposure amount by controlling the exposure control unit 108 based on the determined target D range. A gamma control unit 110 sets a gamma characteristic in the gamma circuit 107 based on the target D range that was determined by the D range control unit 109. A memory 111 stores setting values for specifying gamma characteristics in a table format, for example.

The system control unit 100 can be realized by a combination of a programmable processor such as a CPU, an MPU, or the like, a ROM storing a control program, and a RAM that is used as a work area or the like for deploying the control program. Accordingly, it is possible to realize one or more functional blocks included in the system control unit 100 using software. Of course, one or more functional blocks may be realized by dedicated hardware.

A simple description of operations during imaging will be given below. An optical image of a subject whose brightness is controlled by an aperture is formed on the imaging surface of the image sensor 102 by the optical system 101. The image sensor 102 is exposed to the optical image for a period of time determined by the exposure control unit 108 and obtains an analog image signal. Adjustment of the exposure time is performed using a mechanical shutter or an electronic shutter.

The A/D conversion unit 103 converts the analog image signals into digital image signals. At this time, the signals are amplified using gain values defined by the exposure control unit 108. For example, in the case of a dark subject, control signals are output from the exposure control unit 108 to the A/D conversion unit 103 such that the level of output signals is raised and the signals are output to the signal processing unit 104. The signal processing unit 104 subjects the digital image signals to image processing such as black level correction, white balance adjustment, and edge correction. The signal processing unit 104 outputs digital image data that is undergoing or has undergone image processing to the face detection unit 105 and the image feature obtaining unit 106 and outputs image data that has undergone image processing to the gamma circuit 107 as image signals for recording or display.

The face detection unit 105 detects a region in an image that includes features of a person's face (face region) and outputs the position, size, luminance and the like of the face region to the image feature obtaining unit 106. The image feature obtaining unit 106 obtains image feature information such as the average luminosity value, luminosity level, frequency distribution of color component levels, and the like of the face region and the entire image, based on the image data output from the signal processing unit 104 and the face detection results from the face detection unit 105.

The face detection in the face detection unit 105 can be carried out using a publicly-known technique. Examples of image features that are appropriate for face detection include feature vectors projected into an eigenspace, gradient-based features, Haar-like features, a saliency map extracted by a Sobel filter or average color features, and the like. Additionally, it is possible to use a method of face detection according to an estimate of a face image position and a person's movement using CHLAC features. Note that it is also possible to apply a publicly-known acceleration method such as identification using an ADA-BOOST boosting algorithm or SVM, attachment of a cascade weak identifier, or a reduction of the number of dimensions by projecting into an eigenspace. Note that for the sake of convenience, the present embodiment will describe a case in which the subject to be detected using image features is a person's face, but needless to say, it is possible to detect a face not belonging to a person, and to detect any subject in which the difference between light and dark parts has a large influence on the impression given by the image.

Figure 2A:
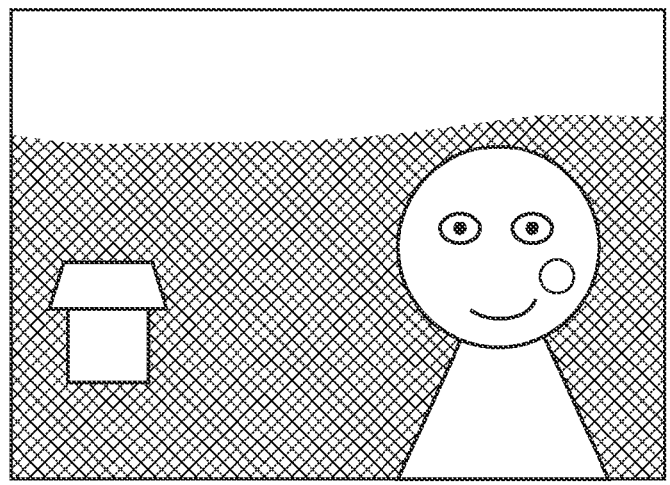
FIGS. 2A to 2C are diagrams showing schematic images for describing dynamic range control in a digital camera according to an embodiment of the present invention.

If a face region of a person is included in the image, D range control of the image is performed using the exposure unit 108, the D range control unit 109, the gamma control unit 110, and the memory 111. Here, a case will be described in which a specific example of D range control is input into an image such as that shown in FIG. 2A.

Figure 2B:
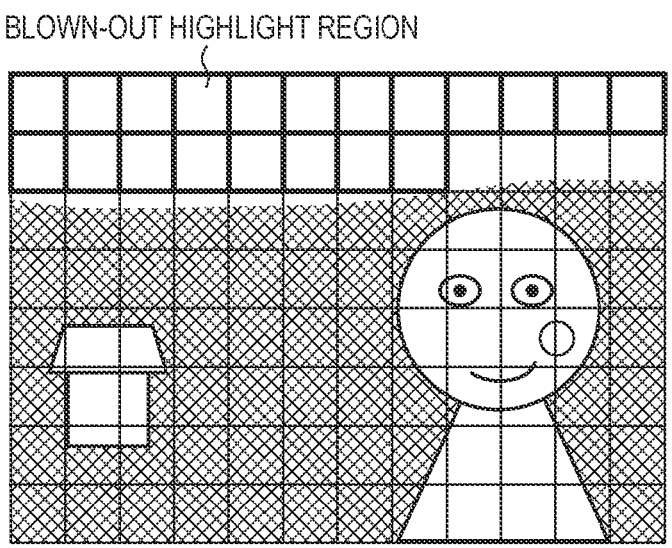

First, the image feature obtaining unit 106 divides the entire image into multiple rectangular regions as shown in FIG. 2B for example, and obtains a representative luminance value for the pixels included in the rectangular regions. There is no particular limitation on what kind of value can be used as the representative value, and it is possible to use the average luminance value or the largest luminance value, for example. Based on the number of rectangular regions having a representative luminance value that is greater than or equal to a threshold value Th (blown-out highlight regions), the D range control unit 109 calculates a value (degree of blown-out highlights) showing the degree of saturation (blown-out highlights) in an image, for example, a percentage of pixels with blown-out highlights or regions of blown-out highlights. For example, it is possible to calculate the number of blown-out highlight pixels using all pixels included in the rectangular regions whose representative luminance value is greater than or equal to the threshold value Th as blown-out highlight pixels. In the example shown in FIG. 2B, there is a blown-out highlight region in the upper portion of the image.

Figure 3A:
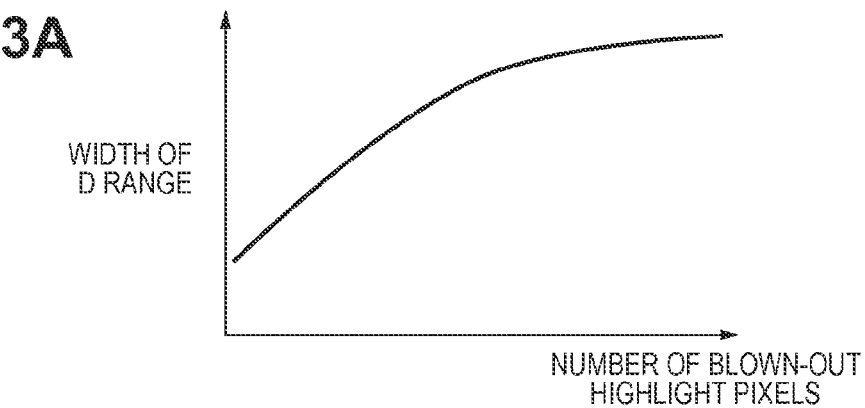
FIG. 3A is a diagram showing an example of a relationship between the number of pixels with blown-out highlights and the width of a D range in an embodiment of the present invention.

According to the calculated degree of blown-out highlights, the D range control unit 109 determines a target D range Dnext based on a correspondence relationship between the degree of blown-out highlights and the width of the D range designed in advance so as to restrain the degree of blown-out highlights to be less than or equal to a predetermined value. FIG. 3A shows a correspondence relationship between the degree of blown-out highlights and the width of the D range in the case of using the number of blown-out highlight pixels as the degree of blown-out highlights. Although the width of the D range increases as the number of blown-out highlight pixels increase, the rate of increase in the D range with respect to an increase in the number of blown-out highlight pixels decreases in areas having a large number of blown-out highlight pixels.

Figure 3B:
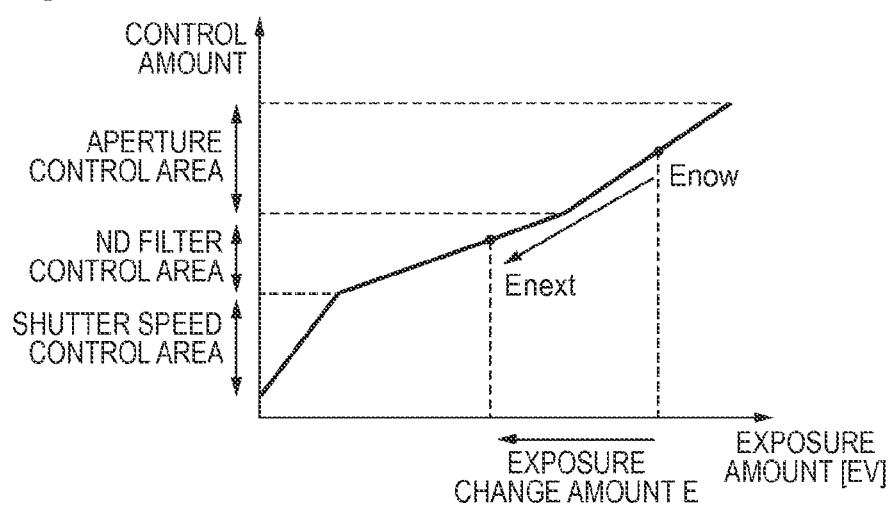
FIG. 3B is a diagram showing an example of a relationship between an exposure change amount and a control amount.

An exposure change amount E depending on the value of the determined target D range Dnext is output from the D range control unit 109 to the exposure control unit 108 and the gamma control unit 110. Based on an exposure control diagram such as that shown in FIG. 3B, the exposure control unit 108 determines a post-change exposure control amount Enext and an exposure control element for realizing it based on a current exposure control amount Enow and a control change amount E. The shutter speed, ND filter, and aperture value are associated as exposure control elements according to the range of exposure control amounts. The exposure control unit 108 controls the optical system 101 and the image sensor 102 based on the post-change exposure control amount Enext and the associated exposure control elements, thereby realizing the post-change exposure control amount Enext.

By changing the exposure control amount, the brightness of the entire captured image changes (in this case, it becomes darker). Because of this, the exposure control unit 108 sets the exposure control amount so as to apply a gain (−E) that corresponds to the exposure control amount E in the A/D conversion unit 103 such that the brightness of the final image does not change from the brightness of the image before the exposure control amount was changed. Accordingly, the brightness of the image at the point in time when it is output from the A/D conversion unit 103 is prevented from changing before and after the exposure control amount is changed. In this way, by changing the exposure control amount, the saturation of the pixels in the image sensor 102 is restrained, and a gain is applied such that the exposure control amount is guaranteed, and it is thereby possible to realize a D range control such that the brightness of the entire image does not change.

Figure 3C:
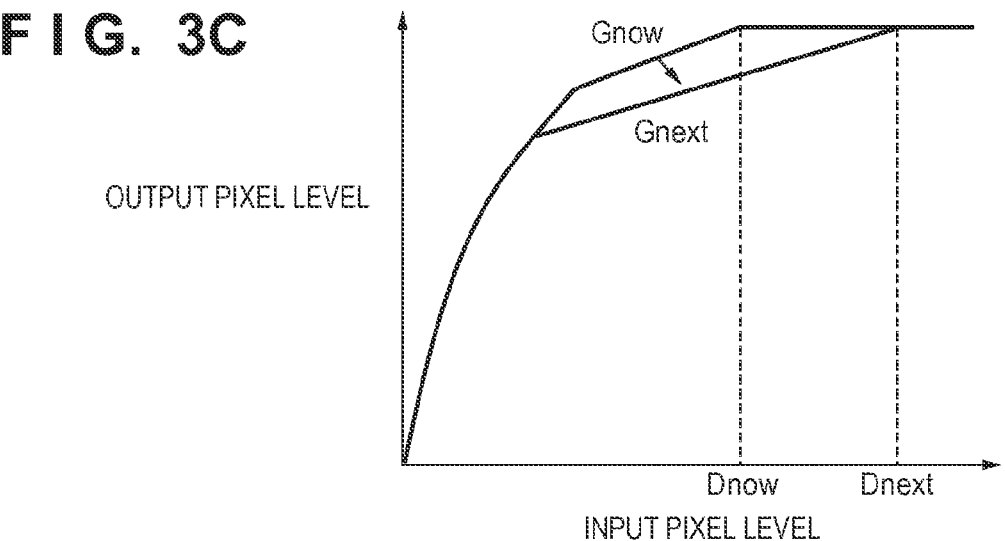
FIG. 3C is a diagram showing an example of change in a gamma characteristic that accompanies change in a D range.

Also, the gamma control unit 110 obtains a setting value for changing the gamma characteristic from Gnow to Gnext according to the exposure change amount E as shown in FIG. 3C for example, from the memory 111 and sets it in the gamma circuit 107. Accordingly, luminance conversion characteristics that supports up to the greatest input pixel level Dnext, which has a greater value than the current greatest input pixel level Dnow are realized. That is to say, a luminance conversion characteristic that supports an input D range that is wider than the current D range is realized.

Additionally, although the above-described D range control expanded the D range of the image, in D range compression processing for compressing the D range of the image, it is not necessary to change the exposure conditions, and changes may be performed to only the luminance conversion characteristics. Since Dnow>Dnext in the D range compression processing, it is a change from the characteristic indicated by Dnext to the characteristic indicated by Dnow in FIG. 3C. Furthermore, it is possible to expand the D range of the image using a publicly-known HDR compositing technique of generating an image with a wide dynamic range by compositing multiple images having different exposure conditions.

In the case of a subject whose emotional expression or impression changes significantly due to a small change in appearance, such as a person's face, there are cases where the impression of the appearance is significantly compromised due to the strength of the brightness or shadow. In view of this, in the gamma control unit 110, appropriate image quality is realized for a person's face region by dynamically changing the gamma characteristic according to the brightness and strength of shadows in the subject region of the person.

Figure 4:
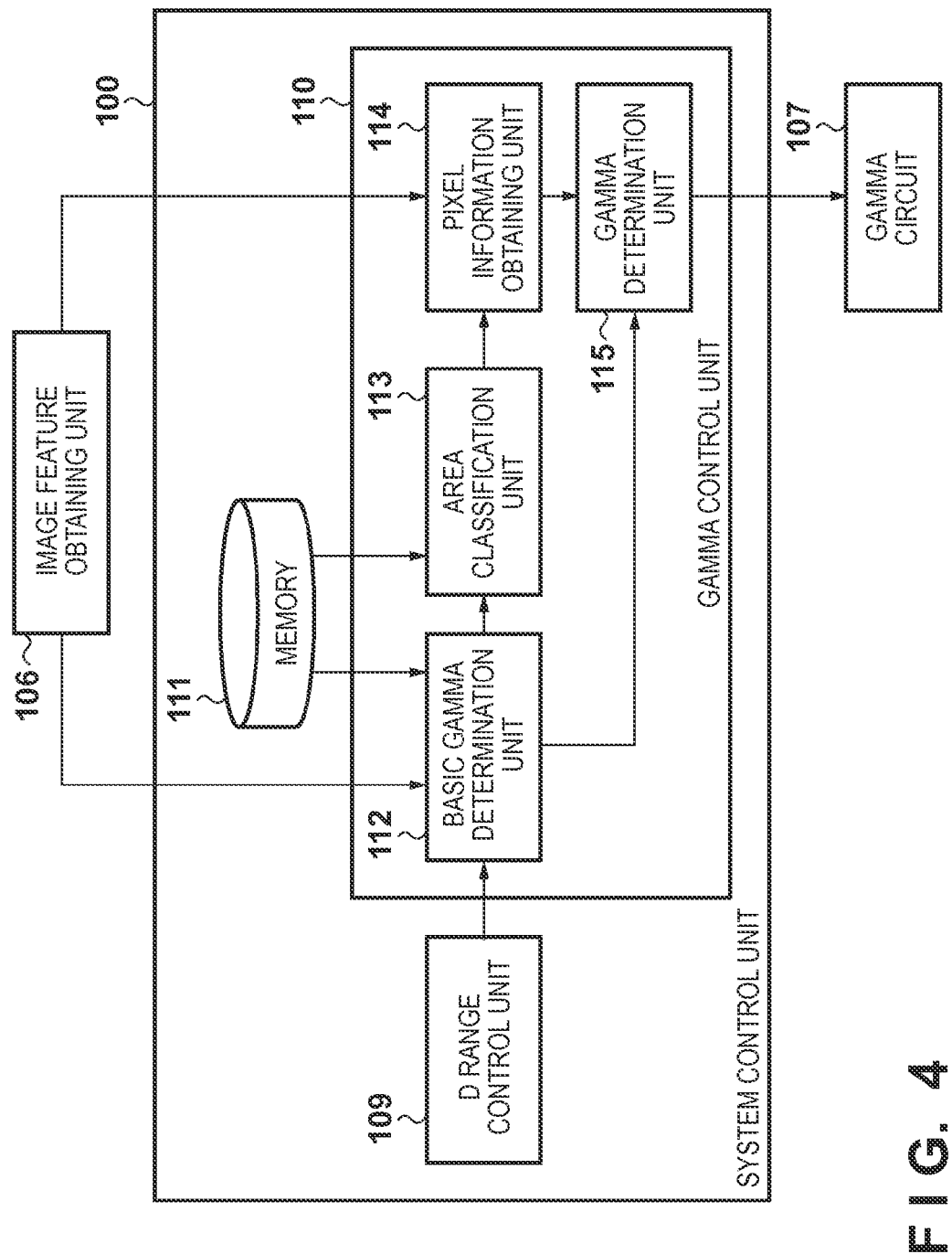
FIG. 4 is a block diagram showing an example of a functional configuration of a gamma control unit and the input and output thereof according to an embodiment of the present invention.
Figure 5:
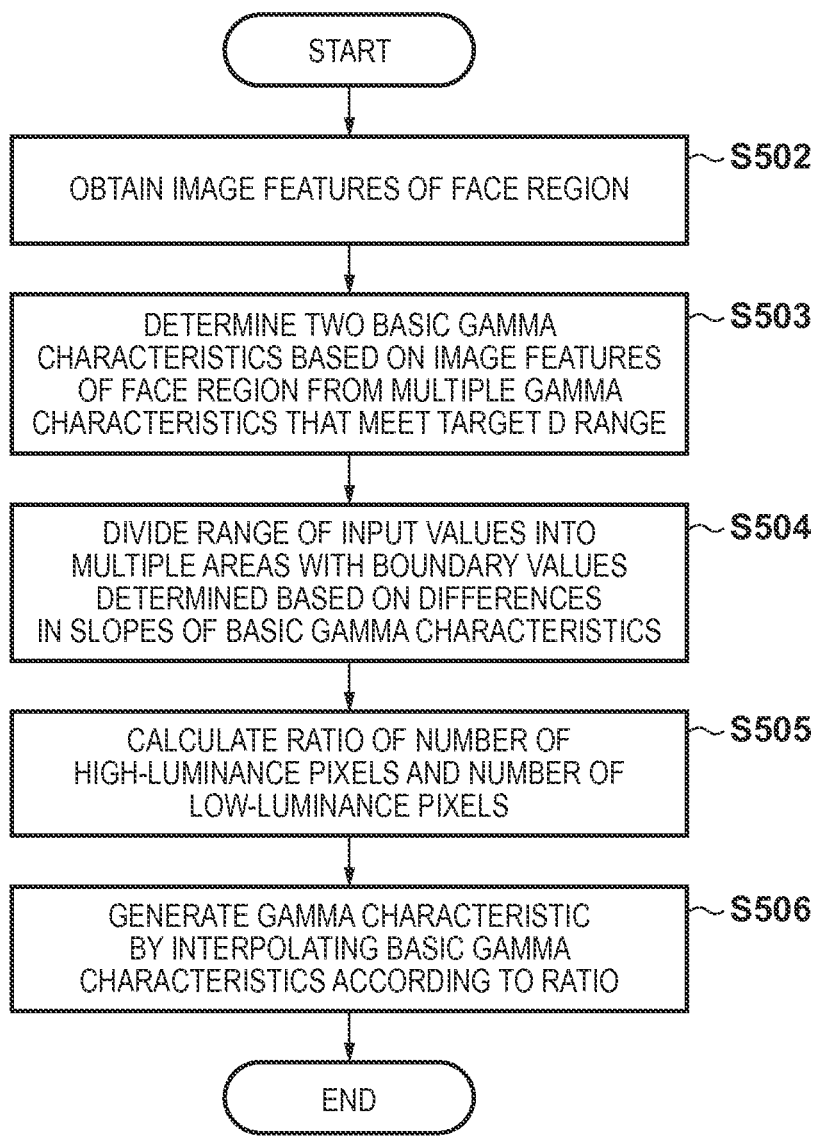
FIG. 5 is a flowchart for describing a gamma control operation according to an embodiment of the present invention.

An operation for controlling gamma characteristics (non-linear conversion characteristics) according to the present embodiment will be described in detail below using FIG. 4, which shows an example of a functional configuration of the gamma control unit 110 and input/output, and the flowchart shown in FIG. 5. Here, the D range control unit 109 has determined the target D range based on the input image.

Figure 2C:
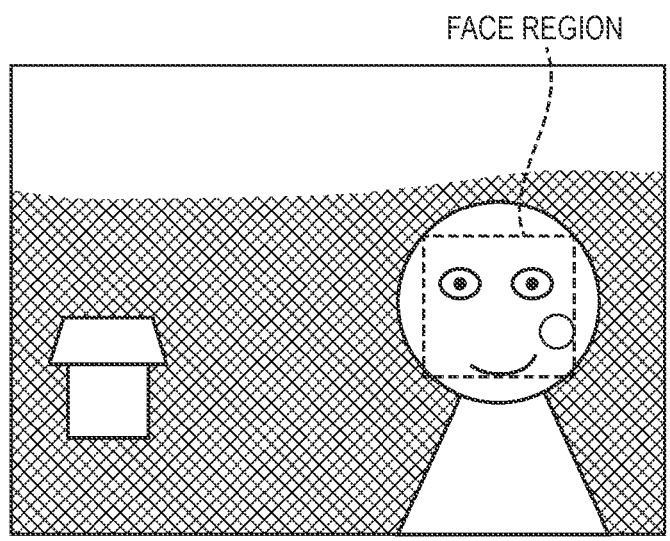

Step S502:

If a person's face region is included in the input image, the face region is detected as shown in FIG. 2C by the face detection unit 105, and the face region information (e.g., face region size, coordinates, likelihood, and the like) is sent to the image feature obtaining unit 106. Then, the image feature obtaining unit 106 obtains an average luminance $Ave_{face}$ and a level frequency distribution (histogram) of luminance components and color components for pixels in the face region, based on the face region information.

Step S503:

A basic gamma determination unit 112 obtains multiple types of basic gamma characteristic candidates for the target D range that was determined by the D range control unit 109 from the memory 111. The memory 111 stores information that enables specification of the gamma characteristic (non-linear conversion characteristic). The information may be of any type or format that enables specification of a gamma characteristic, such as a function indicating gamma characteristics, or a table indicating a relationship between multiple discrete input values and corresponding output values.

Figure 6A:
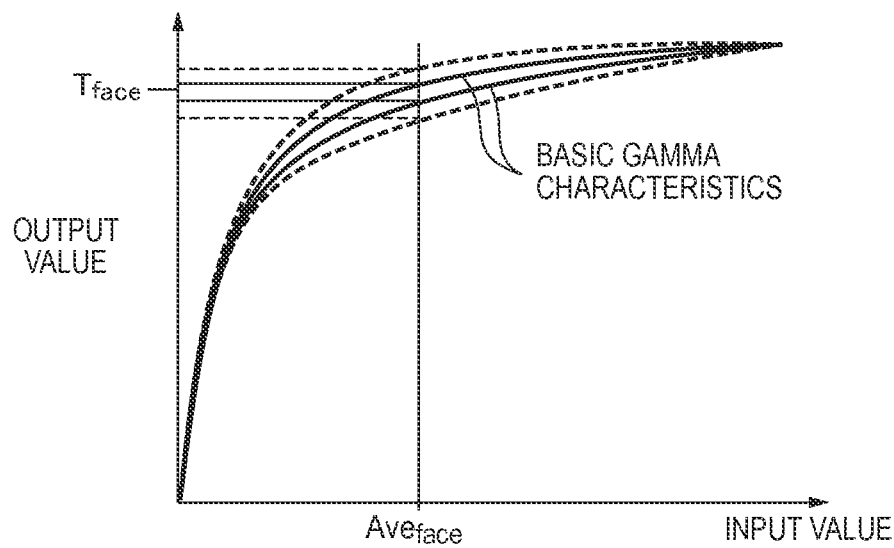
FIGS. 6A and 6B are diagrams schematically illustrating a basic gamma characteristic selection method according to an embodiment of the present invention.

Two types of gamma characteristics that will convert the average face region luminance $Ave_{face}$ obtained by the image feature obtaining unit 106 into output values that are the closest to the target brightness $T_{face}$ are furthermore selected as the basic gamma characteristics by the basic gamma determination unit 112. The target brightness $T_{face}$ may be defined dynamically as a brightness that is appropriate for the exposure of the face region, and it may be determined in advance by experimentation, for example. FIG. 6A schematically shows a case in which two of the four types of basic gamma characteristic candidates are selected as the basic gamma characteristics, the two selected basic gamma characteristics being indicated by solid lines.

Step S504:

An area classification unit 113 divides a range of input values into three areas based on differences in the slopes of the basic gamma characteristics. Portions having a high gamma characteristic slope will have rich tonal expression after conversion, and conversely, in portions having a small slope, the tonality after the conversion decreases to a value that is less than the tonality before the conversion. By comparing the slopes of the two selected types of basic gamma characteristics and detecting an input value range in which there is a large difference between the slopes, the area classification unit 113 detects regions in which the tonality will be significantly different after the two types of basic gamma characteristics are applied.

FIG. 7A shows an example of a case in which the two types of basic gamma characteristics are gamma A and gamma B, one of the gamma characteristics is used as a reference, and a range of input values is divided using input values (Yth 1 to Yth 4) in which the difference from the slope of the other gamma characteristic is a specific value (here, for example, 10% of gamma B's slope). FIG. 7B shows the magnitude relationship between the slopes of the gamma characteristics in each area in the case of area 1 being between Yth 1 and Yth 2, area 2 being between Yth 2 and Yth 3, and area 3 being between Yth 3 and Yth 4. Since gamma A has a slope that is bigger than that of gamma B in area 1, area 1 is an input value range in which using gamma A will result in a richer post-conversion tonality. Conversely, since gamma B has a slope that is bigger than that of gamma A in area 3, area 3 is an input value range in which using gamma B will result in a richer post-conversion tonality. Area 2 is an input value range in which there is no significant difference in the slopes of gamma A and gamma B and therefore there is no significant difference in the post-conversion tonality of either one.

In the present embodiment, a frequency distribution (histogram) of pixel values included in a subject area (here, a face region) of an input image is generated and gammas A and gamma B are subjected to linear interpolation according to the number of pixels included in the areas, and thus a gamma characteristic having a suitable tonality for the post-correction face region is generated.

For example, as mentioned above, the input values at which the slope differences are specific values are registered in advance as area boundary values for combinations in the case of selecting two out of multiple gamma characteristic candidates stored in the memory 111. Then, the area classification unit 113 obtains the area boundary values that correspond to combinations of basic gamma characteristics determined by the basic gamma determination unit 112 from the memory 111 and supplies them to a pixel information obtaining unit 114.

The pixel information obtaining unit 114 obtains a luminance level frequency distribution of pixels included in the face region from the image feature obtaining unit 106 and divides the frequency distribution (histogram) using the boundary values obtained from the area classification unit 113.

Step S505:

FIG. 7C schematically shows a state in which a luminance level frequency distribution has been divided into three areas according to the boundary values Yth 1 to Yth 4, which were used in FIG. 7A. The pixel information obtaining unit 114 finds the sum of the frequencies (number of pixels) of area 1 and area 3 in which there is a significant difference between the slopes of gamma A and gamma B, and performs notification to the gamma determination unit 115. Generally, the luminance values of area 1 correspond to pixels in dark areas of the face region and the luminance values of area 3 correspond to high-luminance areas of the face region. Then, the pixel information obtaining unit 114 calculates a ratio $A_1/A_3$ of the number of pixels $A_1$ included in area 1 and the number of pixels $A_3$ included in area 3.

The value of the ratio $A_1/A_3$ indicates a pixel number difference between the number of high-luminance pixels and the number of low-luminance pixels in that the further the ratio deviates from 1, the larger the difference is. Accordingly, the ratio can be considered to be an evaluation value that indicates the difference between light and dark parts in the face region. Note that it is possible to use an evaluation value other than the ratio $A_1/A_3$ as long as it is a value that indicates a pixel number difference between the number of high-luminance pixels and the number of low-luminance pixels.

For example, it is also possible to use various other evaluation values such as $\log A_1/\log A_3$, $$\sin\left(\frac{A_1 \pi}{2(A_1 + A_3)}\right),$$

or $bA_1 - cA_3$ or $$\frac{A_1^b}{A_3^c},$$

which are expressed using constants b and c, which are design-dependent.

Step S506:

The gamma determination unit 115 interpolates the two basic gamma characteristics using the ratio evaluation value $A_1/A_3$ that was calculated by the pixel information obtaining unit 114 and thereby generates a gamma characteristic that is to be set in the gamma circuit 107. For example, let $P_A$ be the setting value for the gamma circuit 107 that corresponds to the basic gamma characteristic A obtained from the basic gamma determination unit 112, and let $P_B$ be the setting value for the gamma circuit 107 that corresponds to the basic gamma characteristic B. Note that the setting value that corresponds to one gamma characteristic is constituted by output values, or in other words, multiple values, that correspond to predetermined discrete input values for a group of n parameters.

For example, $P_A=[P_{A1}, P_{A2}, \ldots, P_{An}]$. In this case, the gamma determination unit 115 calculates a parameter $P_{Ci}$ of an interpolated gamma characteristic C according to equation (1.1) below based on the corresponding parameters $P_{Ai}$ and $P_{Bi}$ (i=1, ..., n). Note that equation (1.1) below shows a case in which the gamma characteristic B is the reference gamma characteristic.

$$P_{Ci} = P_{Bi} + W_R \frac{A_1}{A_3}(P_{Ai} - P_{Bi}) \qquad (1.1)$$

Figure 6B:
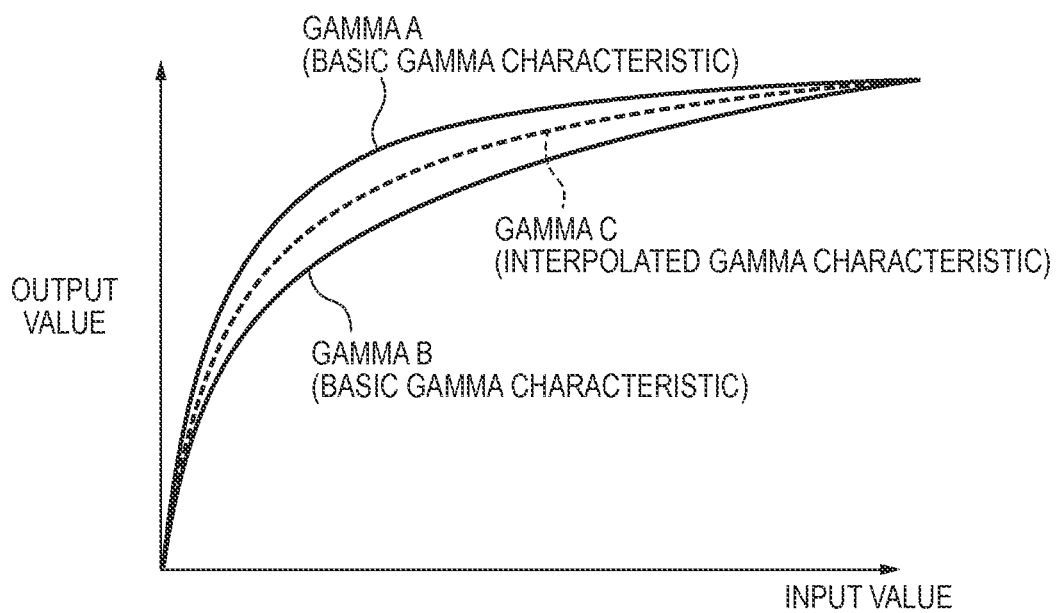

Here, $W_R$ is a weighting coefficient. The weighting coefficient $W_R$ is a value that is calculated in advance by analyzing multiple images that include a face region. The setting value $P_C$ that corresponds to the interpolated gamma characteristic C is obtained by obtaining all parameters $P_{Ci}$ for realizing gamma characteristics. FIG. 6B shows a case of using gamma characteristic C obtained using the basic gamma characteristics A and B and interpolation.

However, in equation (1.1), if there is a large difference in the number of pixels $A_1$ in area 1 and in the number of pixels $A_3$ in area 3, the gamma C that is obtained using interpolation is not limited to being between the gamma A and the gamma B as shown in FIG. 6B and there are cases where the gamma C is outside of the gamma A or the gamma B. The setting value $P_C$ of the gamma C that was calculated in this way is set in the gamma circuit 107 by the gamma determination unit 115. Accordingly, the gamma characteristic that was adjusted with consideration given to the difference between light and dark parts in the detected face region can be applied to an image by the gamma circuit 107.

According to the present embodiment, a gamma characteristic is used, the gamma characteristic having been obtained by interpolating multiple basic gamma characteristics that were selected based on the brightness of a specific subject region (e.g., face region) from among multiple gamma characteristics that meet a target dynamic range. Because of this, it is possible to use an appropriate gamma characteristic depending on the intensity of light and dark parts of a subject.

Note that in the present embodiment, a predetermined gamma characteristic was applied to image data output from the signal processing unit 104 in order to convert the luminance level of the image data, but it is possible to apply the predetermined gamma characteristic so as to convert the signal level of each pixel of the image data. In such a case, the processing that was performed in the above-described embodiment using luminance levels need only be performed by replacing the luminance levels with the signal level of each pixel, and the two basic gamma characteristics need only be interpolated based on an evaluation value indicating a pixel number difference in the number of high-level and low-level pixels.

Note that the setting of the above-described target dynamic range and the gamma characteristic generation processing depending on the difference between light and dark parts in the subject region may be performed periodically, and they may be performed in response to a trigger event such as a scene change being detected. Accordingly, it is possible to realize appropriate dynamic control even in the case where imaging is performed continuously as with a video.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-276123, filed on Dec. 18, 2012, which is hereby incorporated by reference herein in its entirety.

What is claimed is:

1. An image processing apparatus comprising a computer, which functions as:
    a detection unit that detects a subject region based on image data;
    an obtaining unit that obtains a value indicating a difference in luminance between light areas of the subject region detected by the obtaining unit and dark areas of the subject region detected by the obtaining unit;
    a generation unit that generates a non-linear conversion characteristic by interpolating a plurality of non-linear conversion characteristics using the value indicating the difference in luminance between the light areas and the dark areas; and
    a correction unit that applies the non-linear conversion characteristic that was generated by the generation unit to the image data.

2. The image processing apparatus according to claim 1, wherein the generation unit generates the non-linear conversion characteristic by adding, to one of the plurality of non-linear conversion characteristics, a value obtained by multiplying a difference between an output value of the one non-linear conversion characteristic and an output value of another non-linear conversion characteristic of the plurality of non-liner conversion characteristics by a coefficient depending on the value indicating the difference between the light areas and the dark areas.

3. The image processing apparatus according to claim 1, wherein the value indicating the difference in luminance between the light areas and the dark areas is a value indicating a difference between a number of pixels that have a luminance level included in a predetermined range of high luminance levels, and a number of pixels that have a luminance level included in a predetermined range of low luminance levels, among pixels included in the subject region.

4. The image processing apparatus according to claim 3, wherein at least one of the predetermined range of high luminance levels and the predetermined range of low luminance levels is determined by an input value at which a difference between slopes of the plurality of non-linear conversion characteristics is a predetermined value.

5. The image processing apparatus according to claim 1, wherein the computer further functions as:
    a selection unit that selects, from among a plurality of non-linear conversion characteristic candidates, a predetermined plurality number of non-linear conversion characteristics of which output values in case where brightness of the subject region is an input value are closest to a target brightness defined in advance, as the plurality of non-linear conversion characteristics.

6. The image processing apparatus according to claim 5, wherein the computer further functions as:
    a determination unit that determines, based on a degree of blown-out highlights in an entire image, a target dynamic range for restraining the degree of blown-out highlights being less than or equal to a predetermined value,
    wherein the plurality of non-linear conversion characteristic candidates are non-linear conversion characteristics that meet the target dynamic range.

7. The image processing apparatus according to claim 1, wherein the subject region is a region of a face of a person.

8. A method for controlling an image processing apparatus, the method comprising:
    detecting a subject region based on image data;
    obtaining a value indicating a difference in luminance between light areas of the subject region detected in the detecting and dark areas of the subject region detected in the detecting;
    generating a non-linear conversion characteristic by interpolating a plurality of non-linear conversion characteristics using a value indicating the difference between the light areas and the dark areas; and
    applying the non-linear conversion characteristic to the image data.

9. A non-transitory computer-readable recording medium storing a program for causing a computer to function as units of the image processing apparatus according to claim 1.

\* \* \* \* \*